(12) United States Patent
De Oliveira

(10) Patent No.: US 8,853,643 B2
(45) Date of Patent: Oct. 7, 2014

(54) PROTECTED READOUT ELECTRODE ASSEMBLY

(75) Inventor: Rui De Oliveira, Arenthon (FR)

(73) Assignee: CERN—European Organization for Nuclear Research, Geneva (CH)

( * ) Notice: Subject to any disclaimer, the term of this patent is extended or adjusted under 35 U.S.C. 154(b) by 486 days.

(21) Appl. No.: 13/144,561

(22) PCT Filed: Feb. 12, 2009

(86) PCT No.: PCT/EP2009/000995
§ 371 (c)(1),
(2), (4) Date: Jul. 14, 2011

(87) PCT Pub. No.: WO2010/091695
PCT Pub. Date: Aug. 19, 2010

(65) Prior Publication Data
US 2011/0272591 A1    Nov. 10, 2011

(51) Int. Cl.
  *H01J 47/00*    (2006.01)
  *G01T 1/18*     (2006.01)
  *G01T 1/185*    (2006.01)
(52) U.S. Cl.
  CPC .................................... *G01T 1/185* (2013.01)
  USPC ..................... 250/385.1; 250/385.2; 250/374
(58) Field of Classification Search
  USPC .................................. 250/385.1, 385.2, 374
  See application file for complete search history.

(56) References Cited

U.S. PATENT DOCUMENTS

| 6,340,819 B1 | 1/2002 | Durst et al. ................... 250/374 |
| 2002/0003860 A1 | 1/2002 | Francke et al. ............. 378/98.8 |
| 2008/0283725 A1* | 11/2008 | Hahn et al. ..................... 250/207 |
| 2011/0272591 A1 | 11/2011 | De Oliveira .............. 250/385.1 |

FOREIGN PATENT DOCUMENTS

JP    2012-517599 A    8/2012    ................ G01T 1/18

OTHER PUBLICATIONS

"New Micropattern Spark-protected Gaseous detectors and applications to High Energy Physics and Medicine", Detector Seminar at CERN, pp. 1-109, published Dec. 8, 2006 to Peskov et al., available at https://indico.cern.ch/conferenceDisplay.py?confId=a063585.*
European Patent Office, International Search Report and Written Opinion or the International Searching Authority—Application No. PCT/EP2009/000995, dated May 31, 2011 (18 pages).

* cited by examiner

*Primary Examiner* — Mark R. Gaworecki
*Assistant Examiner* — Kenneth J Malkowski
(74) *Attorney, Agent, or Firm* — Sunstein Kann Murphy & Timbers LLP

(57) ABSTRACT

The readout electrode assembly of an avalanche particle detector can be effectively protected against sparks and discharges by means of a plurality of resistor pads formed in a dielectric cover layer above the readout pads. The resistor pads may either be connected directly to the readout pads, or may be coupled capacitively by means of a charge spreading pad embedded into the dielectric cover layer and spatially separated from the readout pads. The charge spreading pad allows the distribution of charges to neighboring readout pads, and may hence increase the spatial resolution of the detector device.

21 Claims, 4 Drawing Sheets

PROTECTED READOUT ELECTRODE ASSEMBLY

FIELD OF THE INVENTION

The present invention relates to a readout electrode assembly for an avalanche particle detector, in particular for a micropattern gas detector (MPGD).

BACKGROUND AND STATE OF THE ART

Particle detectors are devices to detect, track and/or identify radiation or particles, and find wide applications throughout particle physics, biology as well as medical technology.

Particle detectors exploiting the process of ionization and charge multiplication in gases have been in use with continued improvements ever since Rutherford first employed a gas-filled wire counter to study natural radioactivity in 1908. Methods for obtaining large stable proportional gains, increased resolution and greater robustness to sparks and discharges in gaseous detectors are a continuing subject of investigation in the detector community today.

Gaseous detectors typically collect the electrons released by ionizing radiation and guide them to a region with a large electric field, thereby initiating an electron avalanche. The avalanche is able to produce enough electrons to create a current or charge large enough to be collected on a readout electrode assembly and analyzed by readout electronics. The collected electron charge may indicate the charge, energy, momentum, direction of travel and other attributes of the incident particles.

In most such detectors, the large amplification field necessary to initiate and support the electron avalanche comes from a thin wire at a positive high voltage potential. This same thin wire also collects the electrons from the avalanche and guides them towards the readout electronics. More recently, attention has focused on so-called micropattern gas detectors (MPGDs) such as the Micromesh Gaseous Structure Chamber (MicroMegas) and the Gas Electron Multiplier (GEM). By employing semiconductor techniques, large area tracking MPGDs can be mass-produced in an impressive variety of geometries while at the same time allowing small avalanche gaps, and hence rapid signal development, fast readout and high reliability. In MPGDs, the electrons generated in the amplification process are typically collected on metallic readout pads or strips arranged in a predetermined pattern on a semiconductor substrate and electrically connected to fast readout electronics.

In order to protect the readout pads, the detector substrate and the readout electronics, as well as to better insulate neighboring pads, it has become conventional to cover the readout pads with a thin resistive layer. However, finding a material with the right resistivity properties and still allowing easy manufacturing proved to be difficult. Moreover, organic resistive layers that have conventionally been employed as cover layers are rather sensitive to sparks or discharges in the amplification gap, and hence prone to early aging when operated at high counting rates or high amplification fields. Mineral resistive layers are more robust to sparks and discharges, but require complex manufacturing, and are hence less suitable for mass-production of large area detectors.

Sparks may not only damage the readout detector surface, but also inevitably lead to dead times during which events cannot be detected, hence reducing detector efficiency.

OVERVIEW OF THE PRESENT INVENTION

It is an objective of the present invention to provide a readout electrode assembly that overcomes the limitations of the prior art described above. In particular, it is an objective of the present invention to provide a readout electrode assembly offering better protection against sparks or discharges, while at the same time permitting a reduction of detector dead times. The inventive readout electrode assembly with the features of independent claim 1 achieves this objective. The dependent claims relate to preferred embodiments.

A readout electrode assembly for an avalanche particle detector according to the present invention comprises a plurality of readout pads, an insulating layer formed on and/or between said readout pads, and a plurality of resistor pads formed above said readout pads in said insulating layer. In a preferred embodiment, said insulating layer comprises a dielectric.

The resistor pads serve as serial resistors in the electronic readout chain, permitting reliable signal propagation to the readout electrode assembly while at the same time protecting the readout pads and the readout electronics. The insulating layer formed on and/or between the readout pads reduces undesired coupling or crosstalk between neighboring readout pads.

Sparks are typically localized and hence affect only one of the resistor pads, while an avalanche initiated by an incident particle is usually delocalized over a number of resistor pads formed above a given readout pad. Since the resistivity of a plurality of resistor pads is different from the resistivity of a single resistor pad, the readout electrode assembly according to the present invention allows for an improved separation of signals triggered by sparks or discharges from those triggered by events, and hence effectively reduces detector dead times.

According to a preferred embodiment, an upper surface of the resistor pads is flush with an upper surface of the insulating layer. By forming the upper surface of the resistor pads flush with an upper surface of the insulating layer, a detector device with a very smooth readout plane can be achieved.

In a preferred embodiment of the present invention, the resistor pads comprise a first layer comprising a resistor and a second layer formed on said first layer, said second layer comprising a metal. In a preferred embodiment, said metal may comprise copper.

The metallic cover layer formed on the resistor layer offers excellent protection against sparks or discharges, while at the same time allowing good signal propagation to the readout electrode assembly. Due to the protective metallic cover layer, a large variety of resistive materials may be chosen to form the underlying resistor layer, including materials rather sensitive to sparks or discharges, leading to greater flexibility in the design of MPGDs.

According to a further embodiment, a plurality of resistor pads are positioned above a readout pad. By forming a plurality of resistor pads above a given readout pad, the ratio between the signal strength of signals originating from sparks or discharges and signals originating from incident particles can be reduced, resulting in lower dead times and higher detector efficiency. Within reasonable boundaries, the higher the number of resistor pads per readout pad, the better can sparks be distinguished from events. According to a preferred embodiment, at least 20 resistor pads are positioned above a readout pad.

In a readout electrode assembly according to a preferred embodiment of the present invention, some or all of the resistor pads are in direct contact with the readout pads. A direct contact between resistor pads and readout pads permits a particularly efficient signal propagation from the amplification gap via the resistor pads to the readout electrode assembly.

However, the present invention is not limited to readout electrode assemblies in which the resistor pads are in direct contact with the readout pads, but also includes embodiments in which the resistor pads are spatially separated from the readout pads by at least part of the insulating layer. The insulating layer allows for capacitive coupling between the resistor pads and the readout electrode assemblies.

In a preferred embodiment, the distance between the readout pads and the resistor pads, measured along a direction perpendicular to the surface plane of the readout electrode assembly, is in the range of 50 to 200 µm.

The readout electrode assembly according to the present invention preferably comprises a resistive charge spreading pad embedded in the insulating layer between a plurality of said resistor pads and a plurality of said readout pads.

By a suitable choice of the resistivity and/or resistance of the charge spreading pad, the charge spreading pad allows to introduce a predetermined degree of coupling between neighboring readout pads. Hence, the exact location of an event in the amplification gap above a certain readout pad can be determined from the signal ratio at which neighboring readout pads coupled to the given pad via the charge spreading pad fire. As a result, the spatial resolution of the detector device, which may otherwise be limited to the size of an individual readout pad, can be significantly enhanced. Surprisingly then, the spreading of charges over a larger area by means of a charge spreading pad allows for an increased spatial resolution of the detector device.

The inventive readout electrode assembly may comprise a plurality of resistive charge spreading pads embedded in the insulating layer, wherein each charge spreading pad lies between a plurality of resistor pads and a plurality of readout pads.

By providing a plurality of charge spreading pads, each associated with and formed above a predetermined group of readout pads, selected readout pads can be functionally coupled to one another, allowing for greater flexibility in the detector design.

In a preferred embodiment of the present invention, the charge spreading pad/pads is/are in direct contact with the resistor pads. A direct contact allows for a particularly effective signal propagation.

According to a further embodiment of the present invention, a resistance of said readout electrode assembly for charge transport along a direction perpendicular to an upper surface of the readout electrode assembly is different from a resistance of the charge spreading pad/pads for charge transport along a direction parallel to an upper surface of said readout electrode assembly. In particular, a resistivity of said charge spreading pad/pads for charge transport along a direction perpendicular to said upper surface of the readout electrode assembly may be different from a resistivity of said charge spreading pad/pads for charge transfer along a direction parallel to said upper surface of the readout electrode assembly. According to a preferred embodiment, surface resistivities are in the range of 10 to 1000 Ω per square for charge transport in the former direction, and in the range of 0.5 to 10 MΩ per square for charge transport in the latter direction.

By adjusting the resistance of the charge spreading pad/pads along a direction parallel to the upper surface of the readout electrode assembly, which is the resistivity governing the coupling between neighboring readout pads, to the resistance of the readout electrode assembly along a direction perpendicular to the upper surface of the readout electrode assembly, which is the resistivity governing the signal propagation from the amplification gap to the readout pad, the level of crosstalk between neighboring readout pads and hence the spatial resolution of the detector device can be carefully controlled. Adjusting the ratio between resistances or resistivities allows for a suitable compromise between detector sensitivity and spatial resolution.

According to a preferred embodiment, a surface resistivity of the charge spreading pad/pads for charge transport in a direction parallel to an upper surface of the readout electrode assembly is in the range of 1 to 3 MΩ per square.

According to a further embodiment of the present invention, a resistance of the resistor pads for charge transport in a direction perpendicular to an upper surface of the readout electrode assembly is in the range of 10 to 1000Ω. A total resistance of the charge spreading pad/pads and the resistor pads for charge transport in a direction perpendicular to an upper surface of the readout electrode assembly may be in the same range of 10 to 1000 Ω.

According to a preferred embodiment, said readout pad and/or said resistor pads are cylindrical. Cylindrical pads are relatively easy to fabricate. Circular cylinders are particularly preferred. However, the present invention is not limited to cylindrical readout pads and/or resistor pads. In fact, readout pads, resistor pads and charge spreading pads can be formed in virtually any shape, including strips, cuboids, hexagonal pads, radial segments and other readout geometries, depending on the specific detector design.

According to a preferred embodiment, a surface diameter of the resistor pads is in the range of 100 to 200 µm. According to a further embodiment, a surface diameter of said readout pads is 7 to 20 times greater than a surface diameter of said resistor pads.

According to a further embodiment, a surface density of said resistor pads is larger than 25 pads per $mm^2$ of readout electrode assembly surface.

In a preferred embodiment, the readout pads are formed on a dielectric bulk substrate. In particular, a readout pad may be connected by interposers extending through the dielectric substrate to readout means for charge readout and analysis, and may also be connected to polarization means adapted to raise the readout pads to a predetermined potential.

The charge spreading pad/pads may likewise be connected to polarization means by means of interposers extending through the bulk substrate.

According to a preferred embodiment, the readout pads comprise a metal. In a preferred embodiment, said metal may comprises copper, but other metals may likewise be used.

The readout electrode assembly according to the present invention can be used to very good advantage in a large variety of particle detectors, including micropattern gas detectors such as the MicroMegas or GEM detector.

The present invention is also directed to an avalanche particle detector comprising a gas chamber and first, second and third plane electrodes placed in this order in said gas chamber, wherein said first electrode and said second electrode delimit a conversion gap for generation of electrons by incident particles, and wherein said second electrode and said third electrode delimit an amplification gap for multiplication of electrons in an avalanche process. The second electrode is perforated by holes, and the third electrode comprises a readout electrode assembly with some or all of the features of the present invention as described above.

The second perforated electrode and the third readout electrode assembly may be connected to polarization means for generation of a high electric field in the amplification gap. Electrons are generated in the gap and drift towards the readout electrode assembly where they produce a final electron charge to be readout and analyzed. The readout electrode assembly according to the present invention permits an effective signal propagation from the amplification gap to the readout pads while at the same time suppressing the detrimental effects of sparks and discharges that may compromise the detector performance. As a result, higher amplification fields and higher counting rates can be achieved, leading to a detector with significantly increased gain factor and tracking efficiency.

According to an alternative embodiment, the present invention is directed to an avalanche particle detector comprising a gas chamber and first and second electrodes placed in this order in said gas chamber. Said first electrode comprises an insulator having first and second metal coating layers on opposed surface sides thereof, and a plurality of holes extending through said electrode. The detector further comprises polarization means coupled to said coating layers and adapted to raise the first coating layer to a first potential and to raise the second coating layer to a second potential higher than said first potential. Said second electrode comprises a readout electrode assembly according to the present invention with some or all of the features disclosed above.

According to the alternative embodiment, electron multiplication may take place in a plurality of holes extending through a foil with metal coatings on both sides. The generated electrons may then drift to the readout electrode assembly, which is not involved in the amplification process. Also according to the second detector design, a readout electrode assembly according to the present invention permits an efficient charge transport from the amplification gap to the readout pads while at the same time protecting the detector against sparks and discharges.

DETAILED DESCRIPTION OF A PREFERRED EMBODIMENT

The features and numerous advantages of a readout electrode assembly according to the present invention can be best understood from the description of the accompanying drawings, in which.

Figure 1:
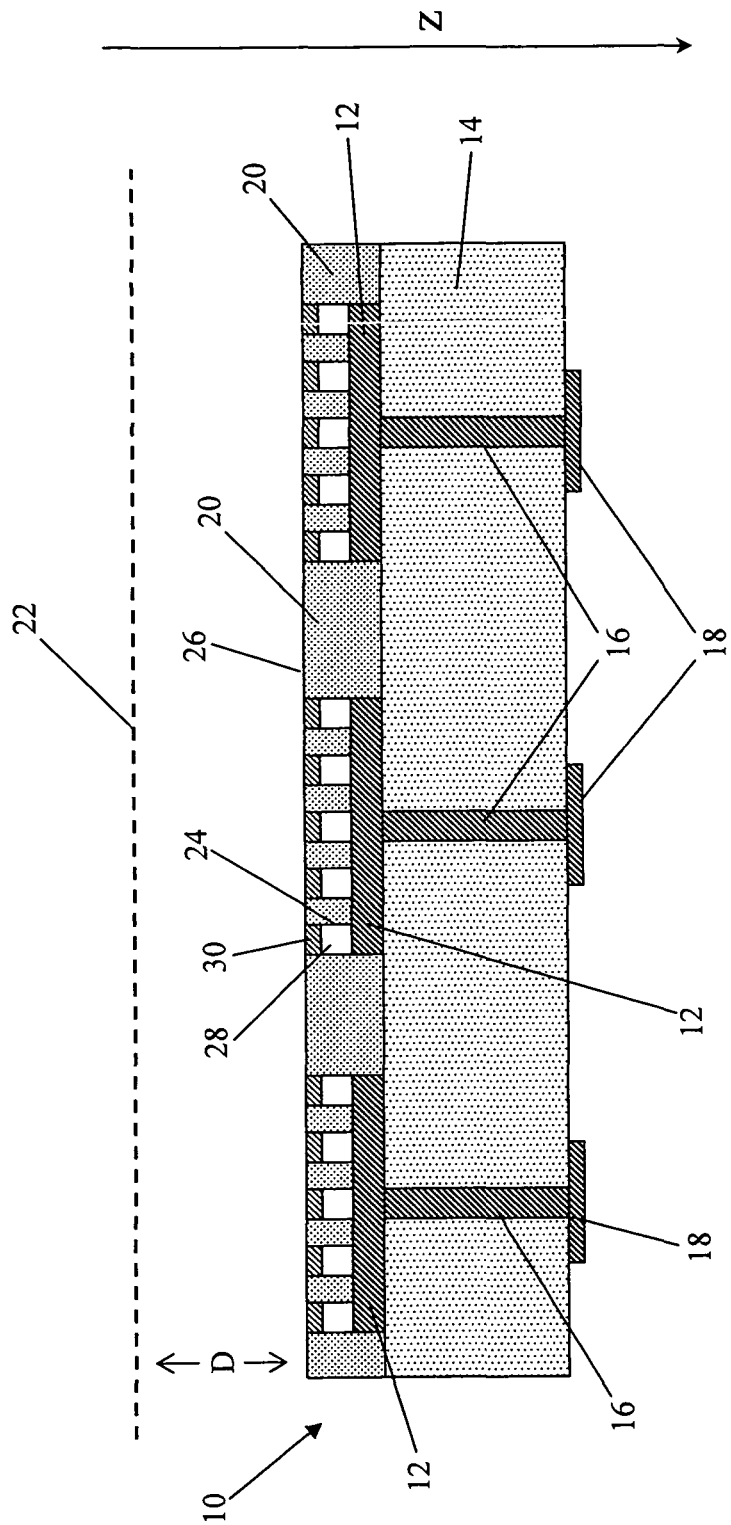
FIG. 1 is a schematic side view of a readout electrode assembly according to a first embodiment of the present invention.

FIG. 1 illustrates a side view of a part of a readout electrode assembly 10 according to the present invention. Readout pads 12 are formed on the surface of a dielectric bulk substrate 14. In the embodiment shown in FIG. 1, the bulk substrate 14 is formed from flame retardant 4 (FR4), an epoxy resin bonded glass fabric, while the readout pads 12 are formed from copper. However, other materials may also be used for the readout pads 12 and for the bulk substrate 14. Metallic interconnectors 16 are embedded in the bulk substrate 14 and connect the readout pads 12 to connector plates 18 formed on the opposite surface of the bulk substrate 14. The connector plates 18 may in turn be connected to polarization means (not shown) for raising the readout pads 12 to a predetermined potential, and to readout means (not shown) adapted to extract electrical charges collected on the readout pads 12. The operation of a readout electrode assembly 10 will be described in greater detail below with reference to FIG. 3.

In the embodiment illustrated in FIG. 1, the readout pads 12 are rectangular with a surface area of roughly 2 mm×2 mm and a thickness of approximately 70 μm, and are distributed at regular intervals on the surface of the bulk substrate 14 at a separation of roughly 100 μm between neighboring pads. However, it is one of the celebrated advantages of micropattern gas detectors that readout pads can be formed in a large variety of different shapes and configurations, including two-dimensional strips, hexagonal pads, radial segments and other readout geometries, depending on the detector design and operating conditions. Examples of readout geometries are described in A. Bressan et al., "Two-Dimensional Readout of GEM Detectors", Nuclear Instruments and Methods in Physics Research A425 (1999) 254-261, which is incorporated herein by reference.

Depending on the readout geometry, readout pads 12 may be individually connected to the readout means, or coupled to neighboring pads for collective readout. Individual readout allows for a particularly high spatial resolution and is hence preferred, but requires the use of very high density electronics.

In the readout electrode assembly 10 depicted in FIG. 1, a dielectric cover layer 20 with a thickness of approximately 200 μm is formed on the bulk substrate 14 and extends above and between the readout pads 12. The dielectric cover layer 20 serves to shield the readout pads 12 from the amplification gap between the readout electrode assembly 10 and a counter electrode 22, which is provided in parallel to the readout electrode assembly at a predetermined distance D and likewise connected to polarization means (not shown). In the embodiment illustrated in FIG. 1, the dielectric cover layer 20 is made from Pyralux 1025, a material commercially available from DuPont, but other dielectric materials may also be used.

A plurality of resistor pads 24 are formed in the dielectric cover layer 20 to extend between the upper surface of the readout pads 12 and the upper surface 26 of the readout electrode assembly 10, so as to be in contact with both the readout pads 12 and the upper surface 26. In the embodiment illustrated in FIG. 1, the resistor pads 24 are cylindrical in shape with a diameter of approximately 100 μm and a height of approximately 150 μm, and are disposed above the readout pads 12 at regular intervals with a separation of roughly 100 μm between neighboring pads. However, the present invention is not limited to cylindrical resistor pads 24 formed at regular intervals. In fact, the resistor pads 24 may be formed in a large variety of different shapes and configurations, such as circular cylinders, cuboids, or the like, depending on the detector design and layout. It is an advantage of the readout electrode assembly according to the present invention that resistor pads 24 can be formed in the dielectric cover layer 20 by conventional lithography, allowing for a large degree of flexibility while still permitting mass production with a high degree of accuracy at relatively low cost.

As illustrated in FIG. 1, each resistor pad 24 consists of a lower layer resistive material 28 in direct contact with the upper surface of the readout pad 12 and an upper metallic layer 30 formed on the lower layer resistive material 28 and extending from there to the upper surface 26. In the embodiment illustrated in FIG. 1, the upper metallic layer 30 of the resistor pads 24 is formed from copper at a thickness of roughly 15 μm, while the lower layer 28 is formed from a high resistivity paste at a thickness of roughly 100 μm, but other materials in other quantities may also be used. The materials and dimensions of the resistor pads 24 are adjusted such that the total resistance of the resistor pads 24 for charge transport along a direction Z perpendicular to the upper surface 26 of the readout electrode assembly 10 is in the range of 10 to 1000 Ohms. The resistivity is chosen to allow electric charges generated in the amplification gap above the upper detector surface 26 to be efficiently transported to the readout pads 12 for readout and subsequent analysis. The upper metallic layer 30 protects the underlying resistive material 28 from sparks and discharges, and hence allows the readout electrode assembly according to the present invention to be employed in detectors experiencing high amplification fields and large event rates.

The readout electrode assembly 10 according to the present invention has the additional advantage of reducing detector dead times, and hence increasing detector efficiency: A readout pad hit by a spark or discharge needs a certain recovery time before it can register subsequent events. This so-called "dead time" reduces the detection rate and hence the detector performance. Due to their high amplification fields, MPGD detectors with high spatial resolution are particularly vulnerable to discharges. However, sparks are usually highly localized and in case of the electrode 10 of FIG. 1 would typically hit only one of the resistor pads 24, while an electron cascade associated with an incident particle is typically delocalized over a larger area, for instance an area corresponding to all the resistor pads 24 formed above one readout pad 12. Hence, the charge deposited by a spark is transferred to the readout pad 12 via a single resistor pad 24 and experiences the electrical resistance of said one resistor pad 24, while the electric charge generated in an avalanche is transported to the readout pad 12 via a plurality of resistor pads 24 in parallel, and hence experiences a much smaller electrical resistance. As a consequence, the sensitivity of the detector device to sparks is significantly reduced while a high sensitivity to events is maintained, thereby reducing detector dead times.

Figure 2:
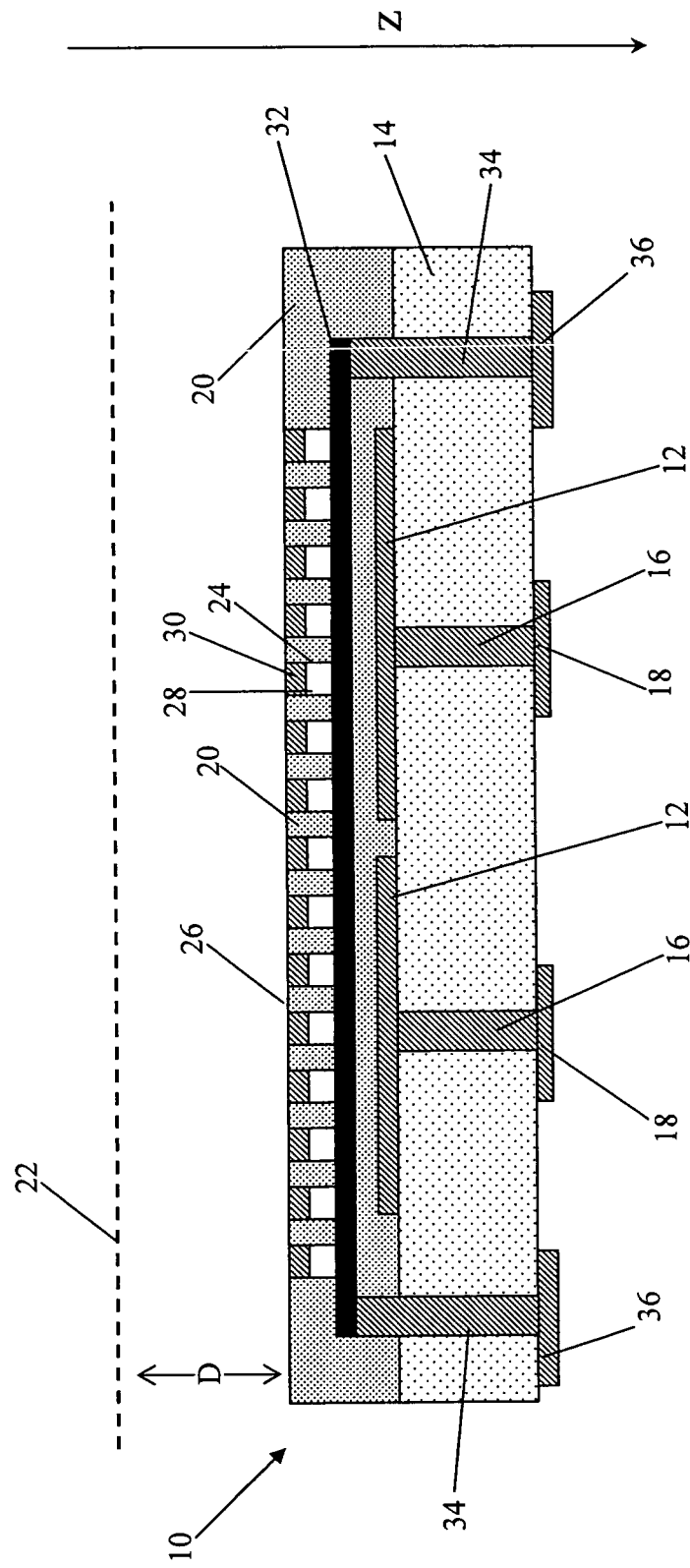
FIG. 2 is a schematic side view of a readout electrode assembly according to a second embodiment of the present invention.

An alternative embodiment of a readout electrode assembly 10 according to the present invention will now be described with reference to FIG. 2. The readout electrode assembly 10 depicted in FIG. 2 is rather similar both in design and layout to the readout electrode assembly described above with reference to FIG. 1, and corresponding elements share the same reference signs. In particular, readout pads 12 are formed on the surface of a dielectric bulk substrate 14, and a dielectric cover layer 20 is provided on and between the readout pads 12. The dimension and configuration of the readout pads 12 correspond to those described above with reference to FIG. 1. As before, a plurality of resistor pads 24 each comprising a lower layer resistive material 28 and an upper metallic layer 30 extending above the lower layer 28 are formed in the dielectric cover layer 20 above the readout pads 12.

However, in contrast to the previous embodiment of FIG. 1, the resistor pads 24 are not formed directly on the readout pads and are not limited to sections extending directly above the readout pads 12. Rather, the resistor pads 24 extend between the upper detector surface 26 and a charge spreading pad 32 embedded in the dielectric cover layer 20, but separated from the readout pads 12. The charge spreading pad 32 is connected to connector plates 36 formed on the opposite side of the bulk substrate 14 via interconnectors 34 extending through the bulk substrate 14 and partially through the dielectric cover layer 20. The collector plates 36 may be connected to polarization means adapted to raise the charge spreading pad 32 to a predetermined potential.

In the readout electrode assembly according to the embodiment of FIG. 2, the charge spreading pad 32 is separated from the readout pads 12 by approximately 70 μm of dielectric cover layer 20, but is capacitively coupled thereto. Hence, charges accumulated on the resistor pads 24 will be transferred to the charge spreading pad 32 and will induce corresponding charges on the underlying readout pad/pads 12, which can then be readout and analyzed via the interconnectors 16 and the connector plates 18. Again, this readout electrode assembly has the advantage of reduced sensitivity to sparks and enhanced robustness while preserving a high sensitivity for events to be detected, as explained above with reference to the alternative embodiment illustrated in FIG. 1.

In addition, the charge spreading pad 32 allows to distribute charges to neighboring readout pads, which allows for an enhanced spatial resolution of the detector device. This is because charges originating from an incident particle and collected by a plurality of resistor pads 24 do not only trigger the readout pad 12 lying in the section immediately below that plurality of resistor pads 24, as is the case in the previous embodiment of FIG. 1. Instead, charges are spread via the charge spreading pad 32 in a direction parallel to the surface 26 of the readout electrode assembly 10, and induce corresponding charges in neighboring readout pads as well. The relative intensity of the signals collected at those neighboring readout pads allows to infer the exact location of the cascade. For instance, if the readout pad to the immediate right of the given readout pad 12 registers a much stronger signal than the readout pad to the immediate left of the given readout pad 12, one can infer that the event originated from above the right hand edge of readout electrode assembly 12. Careful calibration of the readout pads and a suitable interpolation scheme allow to localize events with high precision at a spatial resolution which is no longer limited to the size of an individual readout pad 12, but can be significantly higher. Although surprising at first sight, the distribution of charges over a larger area by means of the charge spreading pad 32 actually leads to a detector device with enhanced spatial resolution by allowing for an interpolated continuous spatial detection instead of a binary detection limited to the spatial resolution defined by the size and spacing of the individual readout pads 12. By adjusting the resistance of the charge spreading pad 32 in the lateral and vertical directions, the degree of charge spreading can be carefully controlled, permitting a suitable compromise between signal sensitivity and spatial resolution.

In the embodiment illustrated in FIG. 2, a single charge spreading pad 32 with a thickness of approximately 15 μm covers all the readout pads 12, and cylindrical resistor pads 24 with a surface diameter of approximately 100 μm and a thickness of approximately 100 to 150 μm are uniformly distributed on the charge spreading pad 32. Any two neighboring resistor pads 24 are separated by 50 to 75 μm of dielectric cover layer 20. However, depending on the detector design and layout, different configurations and geometries may be chosen both for the charge spreading pad 32 and the resistor pads 24. In particular, instead of a single charge spreading pad 32 a plurality of separate charge spreading pads may be employed, each covering an area corresponding to a plurality of readout pads and each in direct contact with a plurality of resistor pads 24 extending from the charge spreading pads to an upper detector surface 26.

In the embodiment illustrated in FIG. 2, the charge spreading pad 32 is formed from a high-resistive polyimide commercially available under the name Kapton 100XClOE7 from DuPont. However, other materials may likewise be employed. The charge spreading pad 32 depicted in FIG. 2 is inhomogeneous so that a resistance for charge transport along a direction Z perpendicular to an upper surface 26 of the readout electrode assembly 10 is different from a resistance for charge transport along a direction parallel to the upper surface 26 of the readout electrode assembly 10. By adjusting the resistance in direction z and the surface resistivity of the charge spreading pad 32, the level of coupling between neighboring readout pads may be carefully controlled.

The surface resistivity or sheet resistivity $R_s$ of a rectangular block of uniform material with a height a, a length l and a width w is generally given by $$\frac{\rho}{h},$$

where $\rho$ is the specific resistance of the material. The total resistance R for charge transport along the length/of the substrate is then given in terms of the surface resistivity $R_s$ as $$R = R_s \cdot \frac{l}{w} = \frac{\rho}{h} \cdot \frac{l}{w}.$$

In the readout electrode assembly according to the present invention, the charge spreading pad has a quadratic surface area. Hence, l=w, and the resistance R for charge transport in a direction parallel to the upper surface 26 of the readout electrode assembly equals the sheet resistivity $R_s$, i.e. R=$R_s$. In order to better distinguish surface resistivity from total resistance, surface resistivity is usually measured in the units Ohm per square.

In particular, the materials and dimensions of the lower layer resistive 28 and the charge spreading pad 32 may be chosen such that a total resistance of the resistor pads 24 and the charge spreading pad 32 for charge transport in the direction Z perpendicular to the upper surface 26 is in the range of 100 to 1000 Ohms, while a surface resistivity $R_s$ of the charge spreading pad for charge transport in a direction parallel to the upper surface 26 of the readout electrode assembly 10 is in the range of 1 to 3 MOhms per square.

The operation of a readout electrode assembly according to the present invention will now be illustrated by way of example for a Micromegas detector, which is known from the publication "MICROMEGAS: A High-Granularity Position-Sensitive Gaseous Detector for High Particle-Flux Environments", Y. Giomataris, P. Rebourgeard, J. P. Robert, G. Charpak; Nuclear Instruments and Methods in Physics Research A376 (1996), pages 29 to 35, as well as from the related U.S. Pat. No. 6,133,575, on which FIG. 3 is based.

Figure 3:
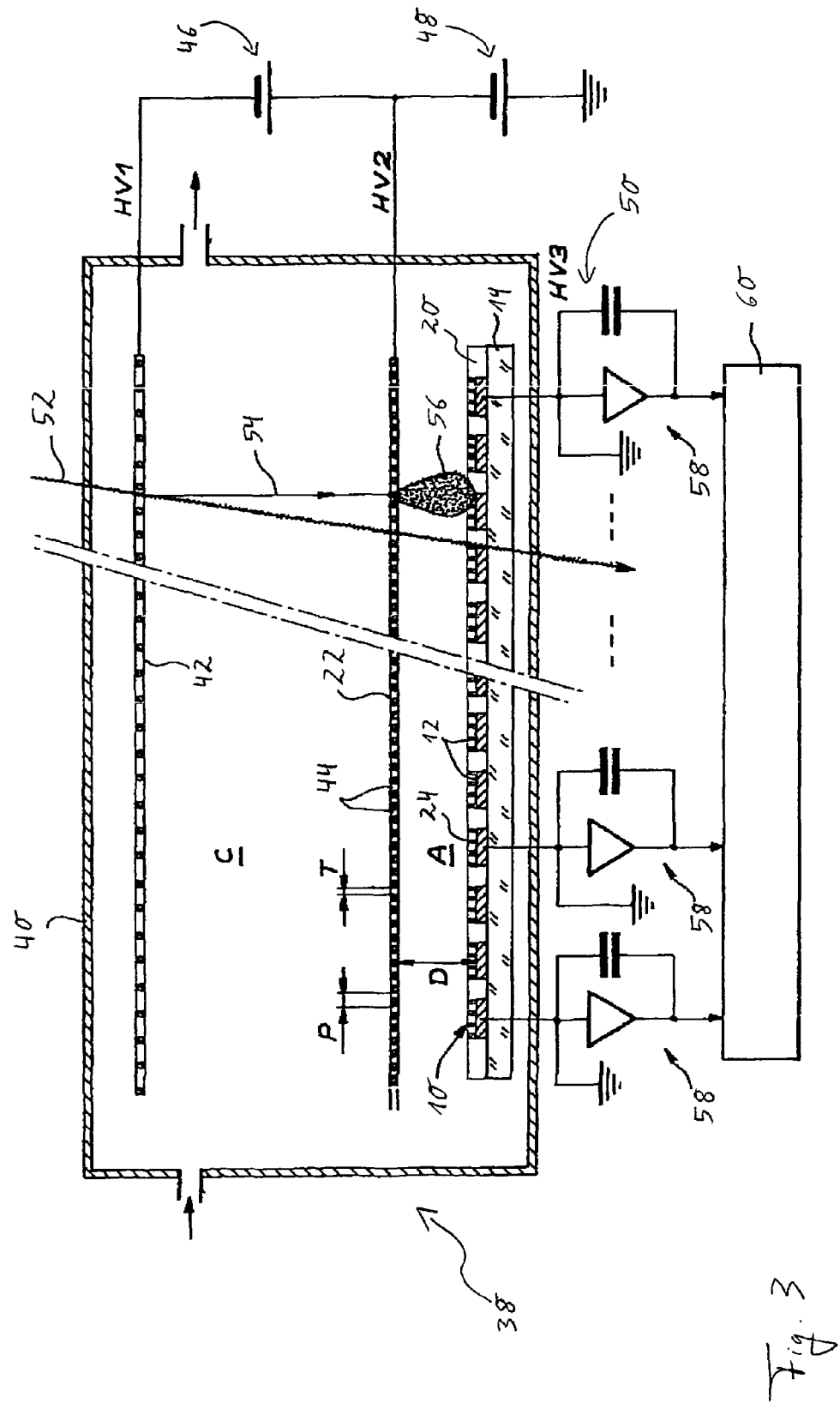
FIG. 3 is a schematic side view showing the operation of a readout electrode assembly according to the present invention in a Micromegas detector.
Figure 4:
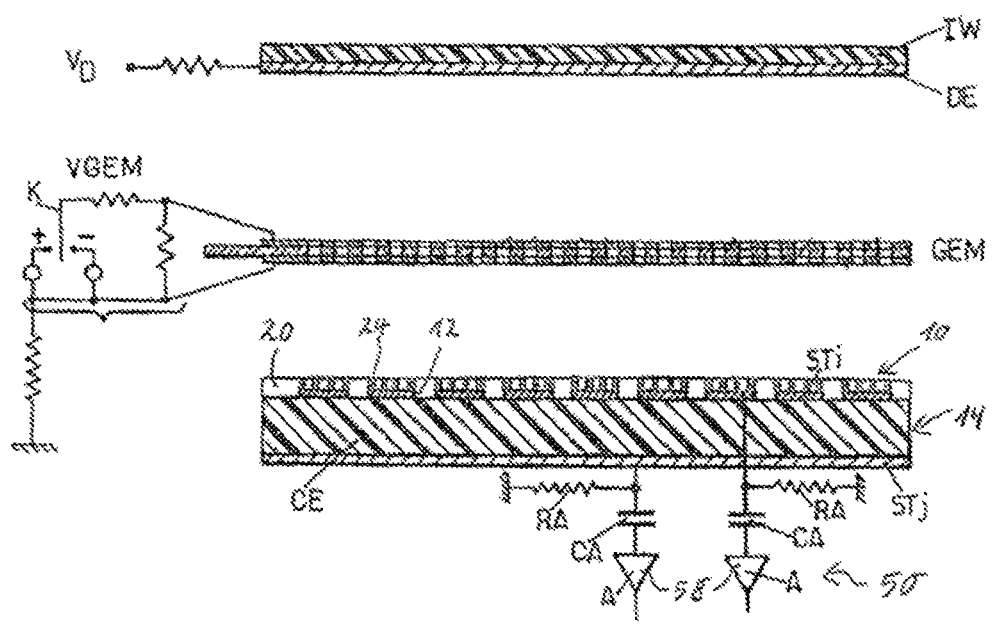
FIG. 4 is a schematic side view showing an avalanche particle detector with a readout electrode assembly in accordance with an embodiment of the present invention.

The Micromegas detector 38 depicted in FIG. 3 comprises a gas chamber 40 provided with means for circulating an appropriate gas, for example a mixture or argon and methane. The detector 38 further comprises first, second and third plane electrodes 42, 22, and 10 placed in this order in the gas chamber 40 and kept parallel to each other. The first electrode 42 and the second electrode 22 delimit a low electric field conversion gap C, where ionizing incident particles create ion-electron pairs, while the second electrode 22 and the third electrode 10 delimit an adjacent high field amplification gap A, where the generated electrons drift to and produce a final electron charge to be readout and analyzed.

The third electrode 10 is a readout electrode assembly according to the present invention as described above with reference to FIG. 1, and is separated from the second electrode 22 by a distance D typically in the range of 25 to 200 μm (not drawn to scale in FIG. 3). The distance between the second electrode 22 and the first electrode 42 can be much bigger, and may amount to approximately 3 mm. The second electrode 22 serves as the cathode of the detector, and consists of an electrically conducting plate with a plurality of holes 44 of a small diameter T formed at regular intervals P. The cathode 22 hence forms a grid which, on account of the small size of its holes 44, is sometimes called a microgrid, or micromesh. The first electrode 42 may likewise consist of a grid with a structure similar to the structure of electrode 22.

The Micromegas detector further comprises polarization means 46 capable of raising the first electrode 42 to a first potential HV1, polarization means 48 capable of raising the counter electrode 22 to a second potential HV2 higher than the first potential HV1, as well as polarization means 50 for raising the readout electrode assembly 10 to a third potential HV3 still larger than the second potential HV2. The voltages HV1, HV2, and HV3 are selected such that the electrical field generated in the amplification gap between electrodes 22 and 10 is much stronger, for example more than ten times stronger, than the electrical field generated in the conversion gap between electrodes 42 and 22. For instance, the electrical field generated in the conversion gap may amount to 1 kV per centimeter, while the electrical field generated in the amplification gap may be chosen at 50 kV per centimeter.

When an ionizing particle passes through the gas chamber 40, it ionizes the gas located in the conversion gap C between the first electrode 42 and the second electrode 22 and typically creates about ten primary electrons in that gap. In FIG. 3, the path of an incident ionizing particle is denoted by reference numeral 52, while the path of one of the primary electrons generated in the conversion gap C is denoted by reference numeral 54. The primary electrons pass through the holes 44 in the cathode 22 and then move into the amplification gap A and towards the readout electrode assembly 10. The crossing through the cathode 22 is facilitated by the high ratio between the field created in the amplification gap A and the field created in the conversion gap C. After passing through the cathode 22, the primary electrons are accelerated by means of the strong field that exists in the amplification gap A, and produce secondary electrons when colliding with gas molecules present inside the amplification gap A. Each of the secondary electrons may then itself produce further electrons by the same impact ionization process, and so force, so that an avalanche of electrons is generated inside the amplification gap A. The avalanche associated with the primary electron along its path 54 is denoted by reference numeral 56.

The positive ions created by the impact ionization process are drawn towards the cathode 22, while the electrons are collected on the resistor pads 24 of the readout electrode assembly 10. As described above, the charge collected on the resistor pads 24 may then be transferred to the readout pads 12 and subsequently be read out and analyzed to infer the attributes of the incident particle 52. The readout means connected to the readout pads 12 comprise both fast amplifiers 58 that amplify electric signals collected by the readout pads 12, and processing means 60 for processing the signals supplied by the fast amplifiers 58.

Protection of the readout electrode assembly 10 against sparks and discharges by means of the dielectric cover layer 20 with resistor pads 24 according to the present invention allows for narrow amplification gaps and strong electrical fields between the anode 10 and the cathode 22, which ensure a high spatial resolution of the Micromegas detector as well as high amplification rates.

However, the 10 according to the present invention is not limited to the Micromegas detector, but may likewise be applied in a variety of other particle detectors, in particular micropattern gaseous detectors. For example, the readout electrode assembly 10 described above with reference to FIGS. 1 and 2 may likewise serve as the anode of a gas electron multiplier detector (GEM) such as the one described in detail in U.S. Pat. No. 6,011,265, and will again result in a detector more robust and less sensitive to discharges while at the same time providing higher detection efficiency.

The embodiments described above and the accompanying figures merely serve to illustrate the readout electrode assembly and particle detectors according to the present invention, and should not be taken to indicate any limitation. The scope of the patent is solely determined by the following claims.

REFERENCE SIGNS 10 readout electrode assembly
12 readout pad
14 bulk substrate
16 interconnector
18 connector plate
20 dielectric coverlayer
22 counter electrode
24 resistor pad
26 upper surface of dielectric coverlayer 20/readout electrode assembly 10
28 lower layer resistive material
30 upper metallic layer
32 charge spreading pad
34 interconnector of charge spreading pad 32
36 connector plate of charge spreading pad 32
38 Micromegas detector
40 gas chamber
42 first electrode
44 holes of counter electrode 22
46 polarization means for first electrode 42
48 polarization means for counter electrode 22
50 polarization means for readout electrode assembly 10
52 path of incident particle
54 path of primary electron
56 avalanche
58 amplifier
60 processing means

The invention claimed is:

1. A readout electrode assembly for an avalanche particle detector comprising:
a plurality of readout pads;
an insulating layer formed on said readout pads; and
a plurality of resistor pads formed above said readout pads in said insulating layer;
wherein said resistor pads are spatially separated from said readout pads by at least part of said insulating layer.

2. The readout electrode assembly according to claim 1, wherein an upper surface of said resistor pads is flush with an upper surface of said insulating layer.

3. The readout electrode assembly according to claim 1, wherein said resistor pads comprise a first layer comprising a resistor and a second layer formed on said first layer, said second layer comprising a metal.

4. The readout electrode assembly according to claim 1, wherein a plurality of resistor pads are positioned above each readout pad.

5. The readout electrode assembly according to claim 4, wherein at least 20 resistor pads are positioned above a readout pad.

6. The readout electrode assembly according to claim 1, wherein the distance between said readout pads and said resistor pads is in the range of 50 to 200 μm.

7. The readout electrode assembly according to claim 1, additionally comprising a resistive charge spreading pad embedded in said insulating layer, said charge spreading pad lying between a plurality of said resistor pads and a plurality of said readout pads.

8. The readout electrode assembly according to claim 7, comprising at least one resistive charge spreading pad embedded in said insulating layer, wherein each said charge spreading pad lies between a plurality of resistor pads and a plurality of readout pads.

9. The readout electrode assembly according to claim 7, wherein said at least one charge spreading pad is in direct contact with said resistor pads.

10. The readout electrode assembly according to claim 7, wherein a resistivity of said charge spreading pad/pads for charge transport along a direction (z) perpendicular to an upper surface of said readout electrode assembly is different from a resistivity of said at least one charge spreading pad for charge transport along a direction parallel to said upper surface of said readout electrode assembly.

11. The readout electrode assembly according to claim 7, wherein a surface resistivity of said charge spreading pad/pads for charge transport in a direction parallel to an upper surface of said readout electrode assembly is in the range of 500 kOhms per square to 10 MOhms per square.

12. The readout electrode assembly according to claim 9, wherein a total resistance of said at least one charge spreading pad and said resistor pads for charge transport in a direction (z) perpendicular to an upper surface of said readout electrode assembly is in the range of 10 to 1000 Ohms.

13. The readout electrode assembly according to claim 1, wherein a resistance of said resistor pads for charge transport in a direction (z) perpendicular to an upper surface of said readout electrode assembly is in the range of 10 to 1000 Ohms.

14. The readout electrode assembly according to claim 1, wherein at least one of said readout pads and said resistor pads is cylindrical.

15. The readout electrode assembly according to claim 14, wherein a surface diameter of said readout pads is 7 to 20 times greater than a surface diameter of said resistor pads.

16. The readout electrode assembly according to claim 14, wherein a surface diameter of said resistor pads is in the range of 100 to 200 μm.

17. The readout electrode assembly according to claim 1, wherein a surface density of said resistor pads is larger than 25 pads per $mm^2$.

18. The readout electrode assembly according to claim 1, wherein said readout pads are formed on a dielectric bulk substrate.

19. The readout electrode assembly according to claim 1, wherein said readout pads comprise a metal.

20. An avalanche particle detector comprising:
a gas chamber;
first, second and third plane electrodes placed in this order in said gas chamber;
said first electrode and said second electrode delimiting a conversion gap (C) for generation of electrons by incident particles;
said second electrode and said third electrode delimiting an amplification gap (A) for multiplication of electrons in an avalanche process;
wherein said second electrode is perforated by holes and said third electrode comprises a readout electrode assembly according to claim 1.

21. An avalanche particle detector comprising:
a gas chamber;
first and second electrodes placed in this order in said gas chamber;

wherein said first electrode comprises an insulator having first and second metal coating layers on opposed surface sides thereof, and a plurality of holes extending through said electrode;
polarization means coupled to said coating layers and adapted to raise said first coating layer to a first potential and to raise said second coating layer to a second potential higher than said first potential;
wherein said second electrode comprises a readout electrode assembly according to claim 1.

* * * * *